United States Patent [19]
Hoffer
[11] 3,780,290
[45] Dec. 18, 1973

[54] RADIATION CAMERA MOTION CORRECTION SYSTEM

[75] Inventor: Paul B. Hoffer, Chicago, Ill.
[73] Assignee: The United States of America as represented by the United States Atomic Energy Commission, Washington, D.C.

[22] Filed: Mar. 28, 1972
[21] Appl. No.: 238,766

[52] U.S. Cl. .......... 250/303, 250/71.5 S
[51] Int. Cl. .......... G01j 39/18
[58] Field of Search .......... 250/71.5 R, 71.5 S

[56] References Cited
UNITED STATES PATENTS

| | | | |
|---|---|---|---|
| 3,573,458 | 4/1971 | Anger | 250/71.5 S |
| 3,532,927 | 6/1968 | Hindel | 250/71.5 S |
| 3,697,753 | 10/1972 | Martone et al. | 250/71.5 S |

*Primary Examiner*—Harold A. Dixon
*Attorney*—Roland A. Anderson

[57] ABSTRACT

The invention determines the ratio of the intensity of radiation received by a radiation camera from two separate portions of the object. A correction signal is developed to maintain this ratio at a substantially constant value and this correction signal is combined with the camera signal to correct for object motion.

8 Claims, 15 Drawing Figures

RADIATION CAMERA MOTION CORRECTION SYSTEM

BACKGROUND OF THE INVENTION

An important technique in radiography involves the use of radioisotopes to outline the object being studied. This is of particular interest in medical radiography where radioisotopes can be placed in selected organs. An image is produced by scanning the subject with a directional counter and building up the image by a printing device which moves in synchronism with the scanning counter. Another method of producing an image is to take a picture of the subject with a camera. The camera consists of a stationary lead shield with a pinhole aperture and a sensitive detector or detectors. Some of the early cameras of this type involved the use of a film to show the image. Improved cameras employ scintillation crystals viewed by a plurality of photomultiplier tubes.

In more sensitive cameras of this type, radiation received by a stationary camera viewing a stationary object is changed to a series of electrical pulses having amplitudes according to the position in the object from which the radiation was emitted. This information is displayed point by point on an imaging device, such as a cathode ray tube, which can be photographed to produce the final image.

While the above systems work well with the stationary objects, there is a problem with a moving object, such as often occurs in the clinical use of such a device. There is a particular problem in imaging the liver and the lung, both of which move in synchronism with the patient's breathing. While in some cases it is possible to have the patient hold his breath and remain motionless for a period long enough to develop a suitable image, it is often not possible to do this. For example, the time period required may be too long for the average person to remain motionless. Also, the patient is often in acute distress due to his illness, and therefore it is not possible for the patient to remain motionless for a period of time long enough to develop a suitable image. Mechanical and electromechanical systems attached to the patient have been developed to detect this motion and compensate for it, but they are not suitable for clinical use. Computers have also been used to process the image to reduce the effects of motion, but this technique is costly and there is an unacceptable delay in obtaining the completed image.

It is therefore an object of this invention to develop an improved radiation camera for imaging objects which move during exposure.

Another object of this invention is to provide a motion correction system for a radiation camera which changes the camera signal to correct for the motion of the object being imaged.

Another object of this invention is to provide a motion correction system for a radiation camera which operates in real time.

DETAILED DESCRIPTION OF THE DRAWINGS

The invention is illustrated in the drawings of which

BRIEF DESCRIPTION OF THE INVENTION

The type of radiation camera with which this invention is used develops output signals as a result of the radiation striking detectors within the camera. Two of the output signals are gamma signals which are applied to the X and Y input terminals of an oscilloscope. The third signal, a Z signal or unblanking signal, is applied to the Z axis modulation of the oscilloscope. Thus, the X and Y gamma signals position the electron beam on the screen of the oscilloscope while the Z signal unblanks the oscilloscope to produce a point of light at that particular position.

The motion correction system of this invention receives the X and Y gamma signals and changes their amplitude to reflect the motion of the object being imaged. The invention compares the radiation received from two separate areas of the object being studied and makes use of the statistical fact that the ratio of the intensity of the radiation received from the two areas will remain essentially constant over a period of time. If this ratio changes, the motion correction circuit senses the change and develops a correction signal which is added or subtracted to the X and Y gamma signals so that their position on the oscilloscope screen is changed to counteract the motion of the object. While both the X and Y gamma signals can be corrected, it is possible to achieve motion correction on particular objects which move only in one direction by correcting only one of the signals. It is also possible to take into account the distance of the radiation signals from a base line so that with certain shaped objects the system does not over correct for the motion of the object.

DETAILED DESCRIPTION OF THE INVENTION

Figure 1:
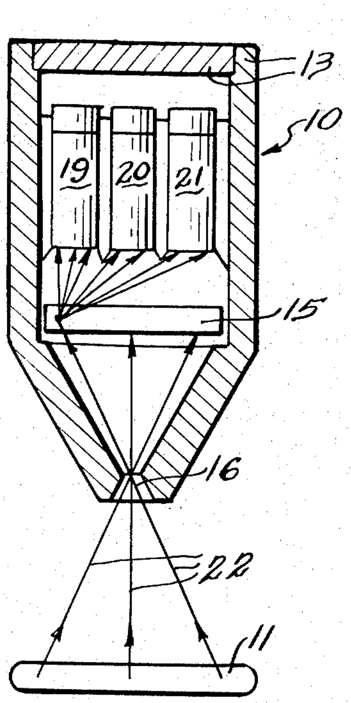
PRIOR ART FIG. 1
FIGS. 1 and 2 show the details of a prior art radiation camera with which this invention is used.
Figure 2:
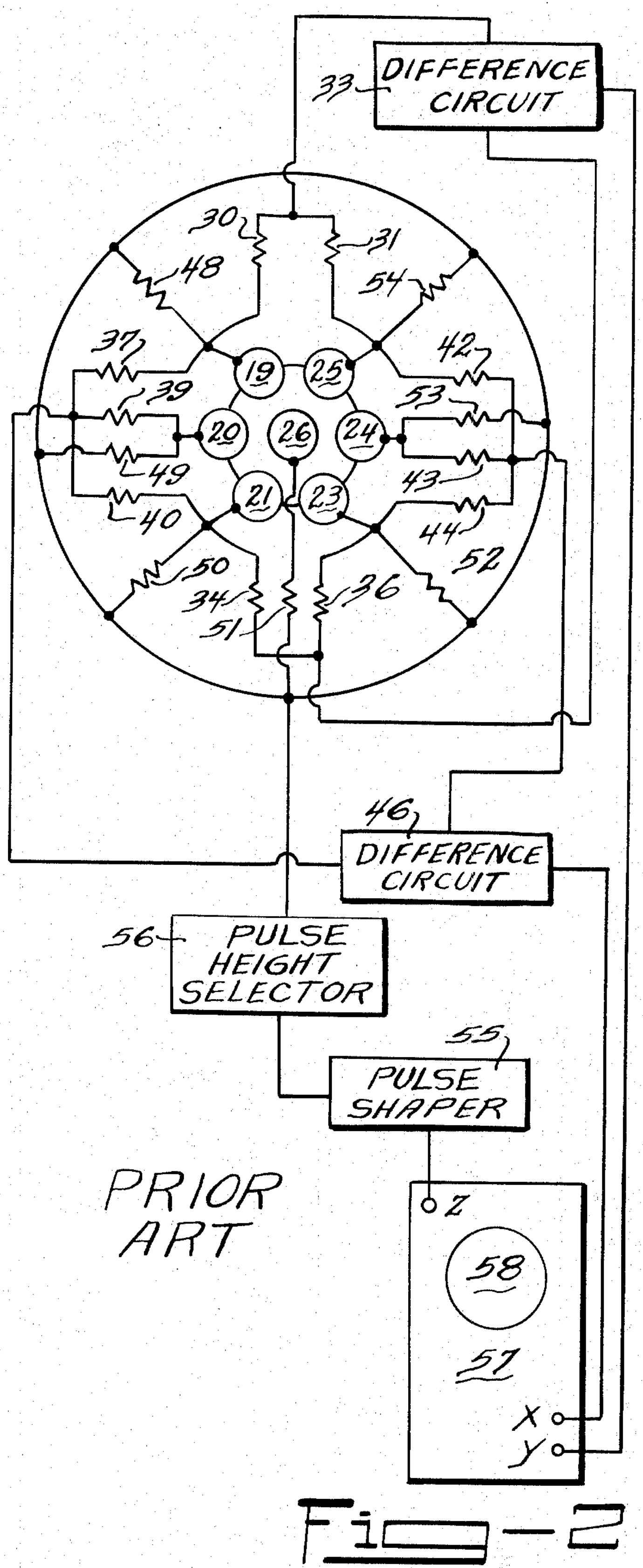

Referring to FIGS. 1 and 2, there are shown drawings of a prior art radiation camera using gamma rays. The camera 10 is used to develop a picture of the object 11 which contains gamma emitting radioisotopes. The camera housing 13 is made of lead and it shields a scintillating crystal 15 on all sides except for the pinhole aperture 16 through which the gamma rays enter. A short distance above the scintillating crystal 15 is a bank of 7 photomultiplier tubes 19, 20, 21, and 23 to 26. The tubes are spaced a minimum distance apart and the spaces between the tubes are covered by bright reflecting surfaces. Lines 22 show the paths of gamma rays which leave object 11 and strike scintillating crystal 15. Each gamma ray develops a light output in scintillating crystal 15 which is detected by each of the photomultiplier tubes with the magnitude of the output from each of the photomultiplier tubes being a function of the position in scintillating crystal 15 struck by a gamma ray.

Figures 5, 6, 7, 8, 9, 10, 11:
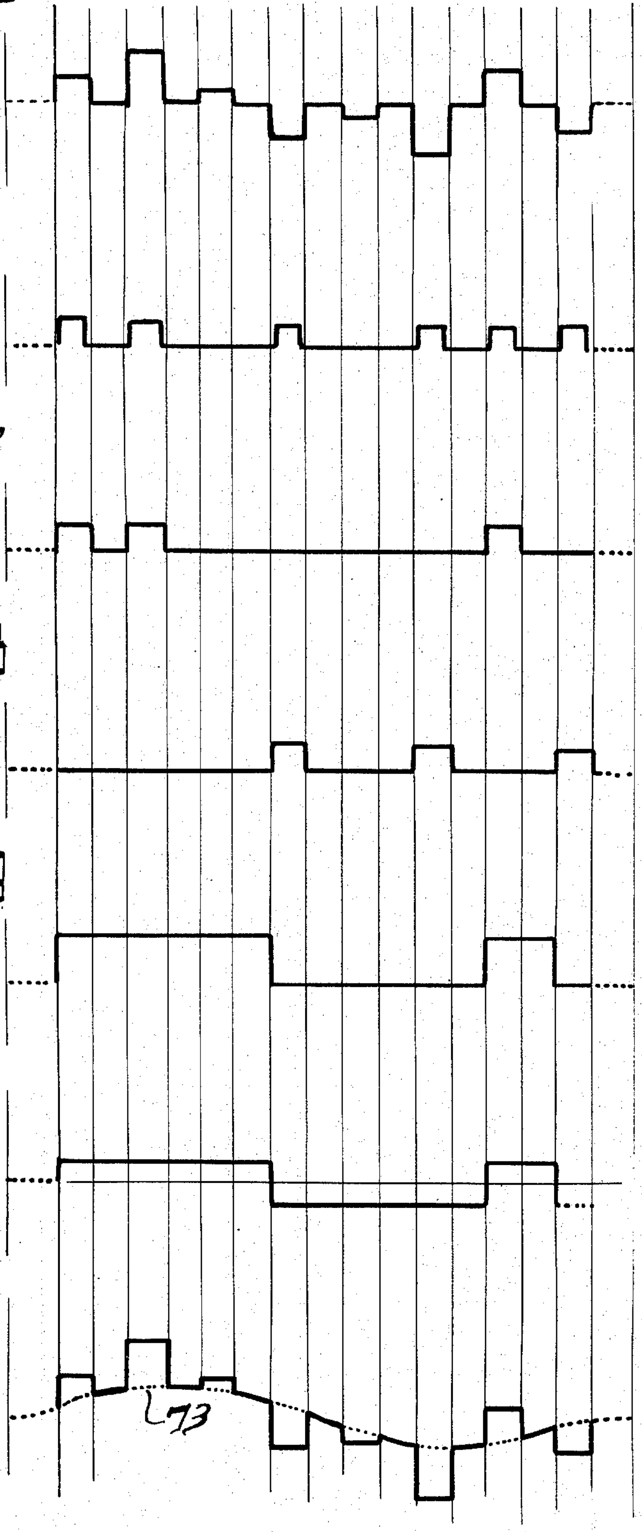
FIGS. 5–11 are curves showing the operation of the motion correction system of FIG. 4.

The gamma Y or Y axis positioning signal is obtained in the following way. The output from phototubes 19 and 25 are fed through resistances 30 and 31 to one terminal of the Y axis difference circuit 33. The output from phototubes 21 and 23 are fed through resistances 34 and 36 to the other terminal of the Y axis difference circuit 33. The four resistances are equal in value. The amplitude of one of the signals is subtracted from the amplitude of the other signal to obtain the gamma Y signal which has an amplitude and polarity depending upon the location along the Y axis of the scintillation in the crystal. An example of a gamma Y signal is shown in FIG. 5. The Y axis difference circuit 33 may also amplify and shape the gamma Y signal as desired.

The gamma X or X axis position signals are obtained in a similar way. The outputs from phototubes 19, 20, and 21 are added through resistances 37, 39, and 40. Resistances 37 and 40 are of equal value, but resistance 39 is one-half the value of the others. This is necessary because phototube 20 has twice the linear displacement along the X axis of the other two phototubes. The outputs of phototubes 23, 24, and 25 are also added through resistances 42, 43, and 44 where the value of resistance 43 is half the value of resistances 42 and 44. The signals thus obtained are applied to the X axis difference circuit 46 to develop the gamma X or X axis position signal. The amplitude and polarity of this signal depend on the location of the scintillation along the X axis. The gamma X and gamma Y signals are coupled to the oscilloscope 57 to position the electron beam.

The outputs of all of the phototubes are added through resistances 48 through 54 and applied to pulse height selector 56. Pulse height selector 56 passes only those pulses having desired amplitudes to the pulse shaper circuit 55. The use of the pulse height selector provides for the selection and display of photopeak pulses from a given isotope. The pulse shaper circuit 55 acts to shorten the pulses and delay them so that the oscilloscope beam is unblanked only at the peak of the gamma X and gama Y signals. The output of pulse shaper circuit 55 is the Z or unblanking signal and is coupled to oscilloscope 58 to unblank the oscilloscope at the proper time to develop a picture on screen 58. An example of a Z signal is shown in FIG. 6. Note the absence of Z signal pulses where the input to pulse height selector 56 was too low to pass through the selector.

Figure 3:
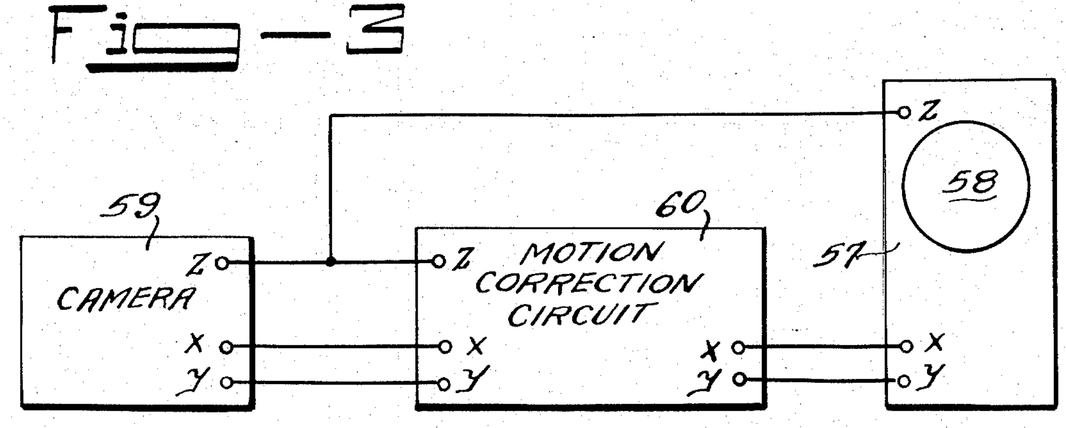
FIG. 3 is a block diagram showing the operation of the system of this invention.

Referring to FIG. 3, there is shown the system of this invention. The Z output of radiation camera 59 is fed to a motion correction circuit 60 and also to the Z input of the oscilloscope 57. The gamma X and gamma Y signals from radiation camera 59 are coupled to the motion correction circuit 60, where their amplitudes are corrected for the motion of the object being imaged. The corrected gamma X and gamma Y signals from motion correction circuit 60 are then applied to the X and Y inputs of the oscilloscope 57.

Figure 4:
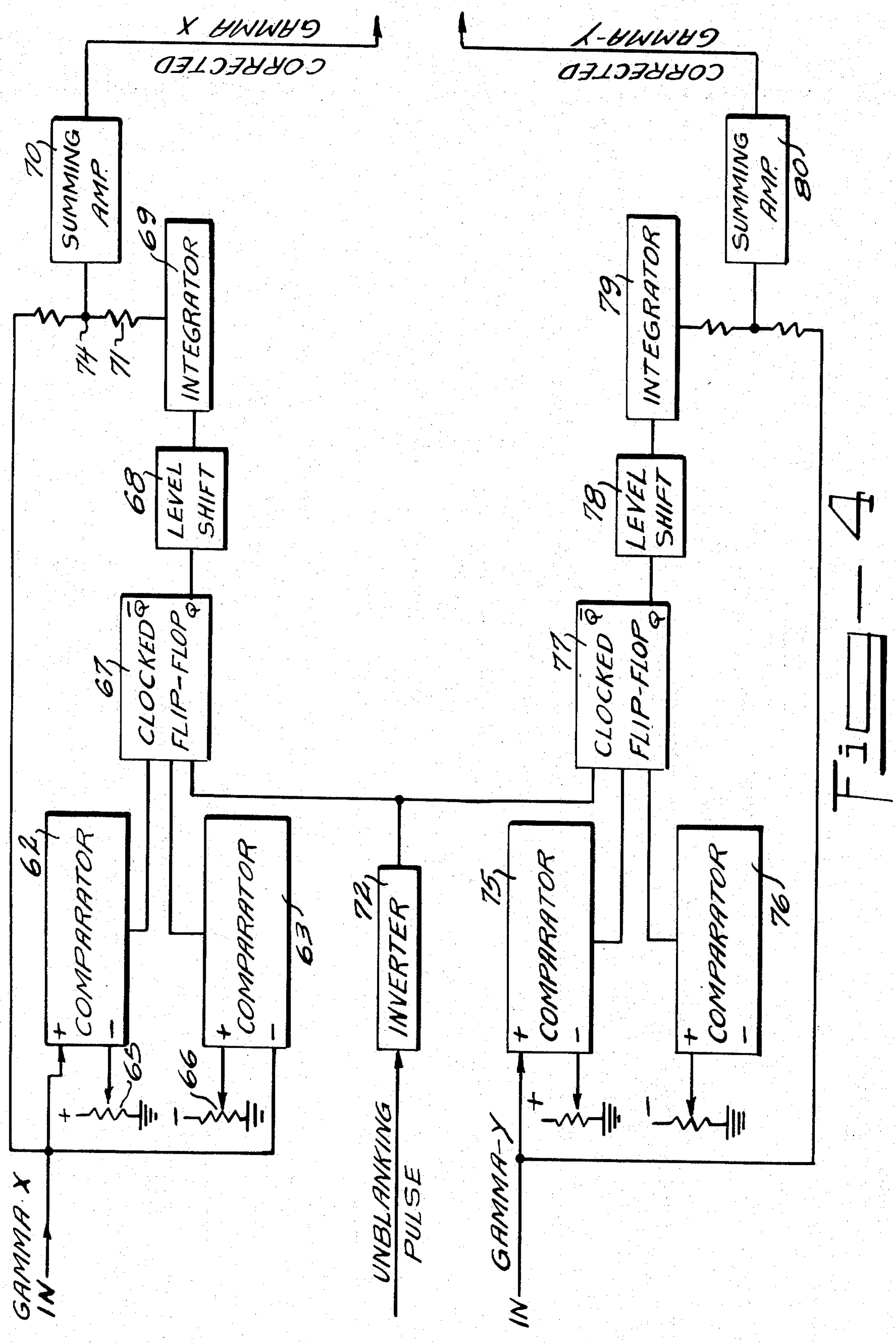
FIG. 4 is a partial block diagram and partial schematic of the motion correction system of this invention.

Referring to FIG. 4, there is shown a detailed block diagram and schematic of the motion correction circuit 60 of FIG. 3. The operation of these circuits in FIG. 4 will be explained together with the curves of FIGS. 5–11. The gamma X signal as shown in FIG. 5 is applied to the gamma X input of comparators 62 and 63. Potentiometers 65 and 66 are set so that the comparators 62 and 63 will devlop outputs only when the gamma signals are above or below a threshold level. The threshold level may be set as desired but in this example the 0 voltage level is set as the threshold so that positive gamma X pulses develop output pulses from comparator 62 and negative gamma X pulses develop output pulses from comparator 63. The output pulses from comparators 62 and 63 are shown in FIGS. 7 and 8 and are of equal amplitude. These pulses are applied to a clocked flip-flop 67.

The Z axis or unblanking pulse is also applied to clocked flip-flop 67 through an inverter circuit 72. Each time the unblanking pulse is received by clock flip-flop 67, the flip-flop shifts to a Q state if the output from comparator 62 is positive and to a $\bar{Q}$ state if the output from comparator 63 is positive. The output from the clocked flip-flop 67 is shown in FIG. 9. The output of flip-flop 67 is not a suitable voltage level for integrating so the level shift 68 shifts the base line of the output of flip-flop 67 so that the output signal from level shift 68 has positive and negative values.

The output signal from level shift 68 is applied to integrator 69 which integrates the signal to develop the correction signal. Integrator 69 must have a long enough integration period so that statistical fluctuations in the radiation received by the camera will not show in the correction signal. The period of integration must also be short enough so that the changes in the radiation pattern occasioned by movement of the object being imaged develops changes in the correction.

Assume that the object being imaged has a base line with equal radiation from each side of the base line and that the gamma X input has alternating positive and negative values. The signal into integrator 69 will be an approximate square wave and the correction signal will be a zero voltage. If the base line is not centered so that, for example, more positive gamma X pulses are received than negative gamma X pulses, the correction signal from integrator 69 will be a DC voltage level which will be constant. This DC level can be permitted to shift the image on the oscilloscope or adjustments may be made to reduce this residual DC level to zero as desired.

The output of integrator 69 is coupled to summing amplifier 70 through resistor 71. Where the object is moving during the imaging process an alternating wave such as wave 73 of FIG. 11 is developed the output of integrator 69. This correction wave 73 is combined with the gamma X input at the summing junction 74 and applied to amplifier 70 to produce a corrected gamma signal. This output is shown in FIG. 11 and increases or decreases the amplitude of the gamma X pulses according to the movement of the object. It should be noted that a very large number of gamma pulses form the correction signal and that the corrected gamma signal of FIG. 11 would have a very large number of gamma pulses. Only a few are shown for clarity.

The gamma Y input is applied to comparators 75 and 76, flip-flop 77, level shift 78, integrator 79 and summing amplifier 80 to produce a corrected gamma Y output in the same manner as the corrected gamma X output is developed. Where the motion is one dimensional, only a single gamma corrector is required. This is quite often true in imaging an object such as a liver where the respiratory motion imparted to the liver is one dimensional.

The motion correction system of FIG. 4 is responsive only to the ratio of the number of counts from different portions of the image. While this type of system works well for many objects and for normal patients, there are certain objects which do not respond well to this type of motion correction device. One problem with this system is that it is sensitive to the shape of the object. If the object is triangular in shape, such as a liver, or square, the system works well. Where the object is elongated, the correction signal developed by this system may not be sufficiently correct to give good motion correction. Since each pulse which goes into the integrator is the same amplitude, any pulse above the base line receives the same weight no matter how far above the base line the pulse is. For example, if a point source is located on the base line and is moved above and below the base line, the integrator will indicate that entire radiation is coming from above the base line or below the base line and develop an extremely large correction signal. The signal will over correct and will not indicate how far above or below the base line the object has moved. While this is an extreme case not likely to occur, it illustrates the problem which can occur with a real object.

Figure 12:
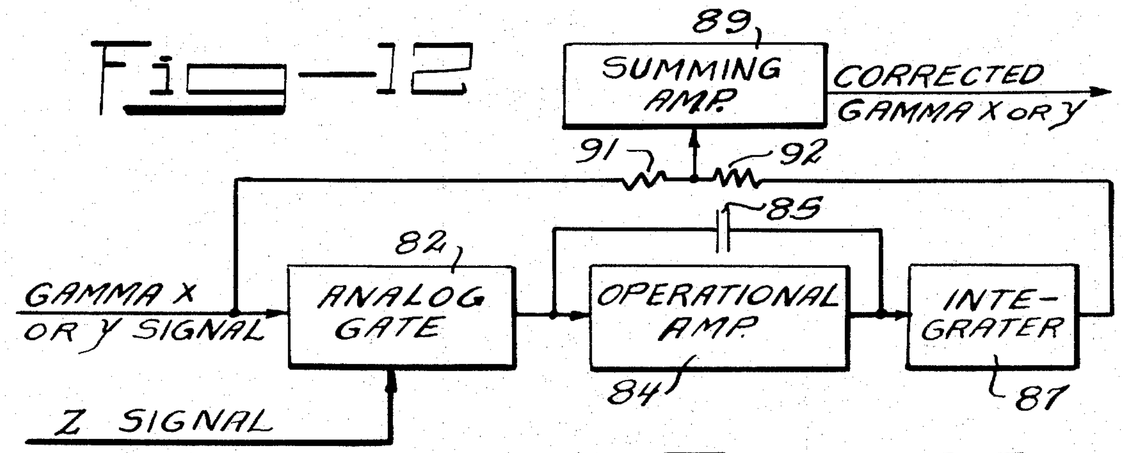
FIG. 12 is a partial block diagram and partial schematic showing the operation of another embodiment of this invention.

Referring to FIG. 12, there is shown a circuit which takes into account the count ratio and amplitude of the pulses coming into the motion correction system. In this circuit only a single gamma signal is shown. However, for a two dimensional correction system, the circuit of FIG. 12 need only be duplicated. For example, the gamma X signal is coupled to analog gate 82 which is opened by the Z signal. Thus whenever a Z signal is received the gamma signal at the input to gate 82 is coupled to the operational amplifier 84. The amplitude of the gamma signal is stored on capacitor 85 until a new gamma signal is applied to the operational amplifier circuit through gate 82. Thus the input signal to integrator 87 has an amplitude which is determined by the position in the object of the radiation event which develops the gamma pulse.

Figure 13:
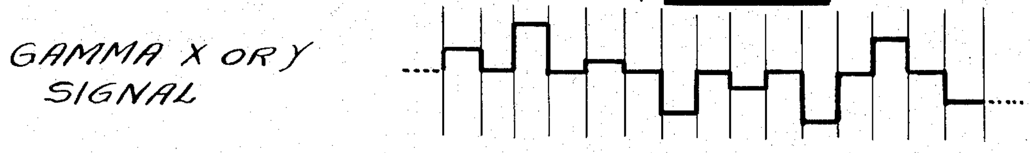
FIGS. 13–15 are curves illustrating the operation of the system of FIG. 12.
Figure 14:
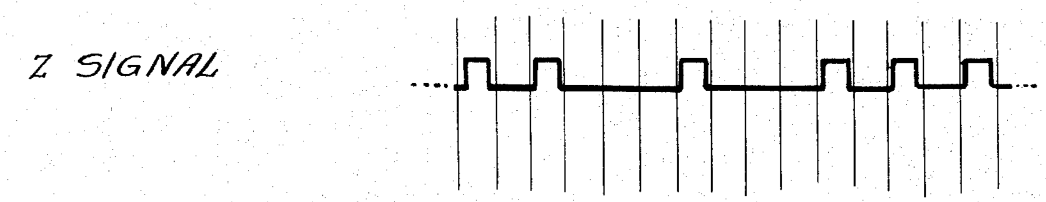
Figure 15:
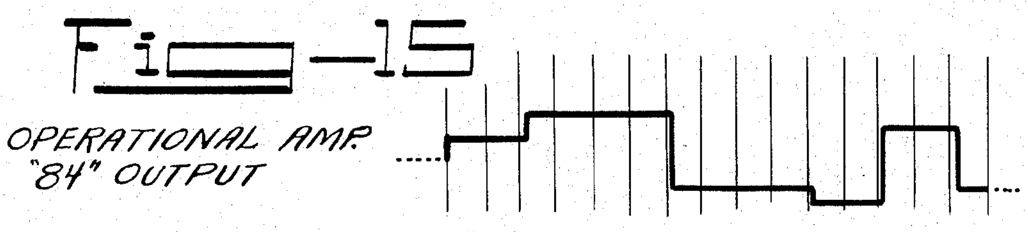

This is shown in FIGS. 13–16. The voltage pulses of FIG. 13 are the same as those of FIG. 5 and represent the incoming gamma signal. Each of the blanking pulses in FIG. 14 acts to enable analog gate 82 to charge capacitor 85 to the voltage level of the gamma signal present at the time of receipt of the Z signal. The output from operational amplifier 84 and capacitor 85 is shown in FIG. 15. It can be seen that this input to integrator 87 differs from the input to the integrator 69 shown in FIG. 10 in that it retains the amplitude information. The output from integrator 87 is coupled to summing amplifier 89 through resistor 91 and is added to the gamma input which is received through resistor 92. The corrected gamma signal is similar in appearance to that shown in FIG. 11, except that the correction signal now includes amplitude information.

The embodiments of the invention in which an exclusive property or privilege is claimed are defined as follows:

1. An object motion correction system for use with a radiation imaging device which includes radiation sensing means of a type which develops a first gamma signal and an unblanking signal in response to radiation received from the object being imaged, the first gamma signal consisting of a series of pulses with the amplitude of each pulse representing the magnitude of one dimension of the position in the object of the radiation event which developed the pulse, the radiation imaging device further having recording means for displaying each radiation event at its proper position to develop an image representing the distribution of radioactive material in the object, said object motion correction system including in combination, first input circuit means coupled to the radiation sensing means for receiving the first gamma signal and the unblanking signal, first gating means coupled to said first input circuit means and responsive to the first gamma signal and the unblanking signal to develop first input signals having an amplitude and polarity determined by the amplitude and polarity of the first gamma signal at the time of receipt of the unblanking signal, first integration means coupled to said gating means for integrating said first input signals to develop a first correction signal, first summing means coupled to said first integration means, said first input circuit means and the recording means, said first summing means acting to add the first gamma signal to said first correction signal to develop a corrected first gamma signal and apply the same to the recording means.

2. The object motion correction system of claim 1 wherein: the first gamma signal pulses developed from radiation from one portion of the object have a positive polarity and the first gamma signal pulses developed from radiation from the remaining portion of the object have a negative polarity, said first input circuit means including first and second comparator circuits each receiving the first gamma pulses, said first comparator being responsive to the positive polarity first gamma pulses to develop first trigger pulses therefrom and said second comparator being responsive to the negative polarity first gamma pulses to develop second trigger pulses therefrom, said first gating means being coupled to said first and second comparators, said first gating means being responsive to the unblanking signal and said first trigger signal to develop said first input signal of a first amplitude and further being responsive to the unblanking signal and said second trigger signal to develop said first input signal of a second amplitude.

3. The object motion correction system of claim 1 and further including, amplitude level shifting means coupling said first gating means to said first integration means, said amplitude level shifting means acting to change said first and second amplitudes of said first and second trigger signals to desired levels.

4. The object motion correction system of claim 1, wherein said first gating means includes storage means responsive to the unblanking pulse to store a reference signal representing the amplitude of the first gamma signal present at the time of the unblanking pulse for the period of time between unblanking pulses, said storage means being coupled to said integration means for integration of said reference signals to develop said first correction signal.

5. The object motion correction system of claim 1 wherein the radiation sensing means further develops a second gamma signal in addition to the first gamma signal, the second gamma signal consisting of a series of pulses with the amplitude of each pulse representing the magnitude of a second dimension of the position in the object of the radiation event which developed the pulse, said object motion correction system further including, second input circuit means coupled to the radiation sensing means for receiving the second gamma signal and the unblanking signal, second gating means coupled to said second input circuit and responsive to the second gamma signal and the unblanking signal to develop second input signals having an amplitude and polarity determined by the amplitude and polarity of the second gamma signal at the time of receipt of the unblanking signal, second integration means coupled to said second gating means for integrating said second input signals to develop a second correction signal, second summing means coupled to said second integration means, said second input circuit means and the recording means, said second summing means acting to add the second gamma signal to said second correction signal to develop a corrected second gamma signal and apply the same to the recording means.

6. A method of correcting for object motion in a radiation imaging system which develops a gamma signal and an unblanking signal in response to radiation from the object being imaged, the gamma signal consisting of a series of pulses, with the amplitude of each pulse representing the magnitude of one dimension of the position in the object of the radiation event which developed the pulse, including the steps of:

a. developing input signals having an amplitude and polarity determined by the amplitude and polarity of the gamma signal at the time of receipt of each unblanking signal;
b. integrating said input signals over a predetermined time period to develop a correction signal; and
c. adding said correction signal to the gamma signal to develop a gamma signal corrected for object motion.

7. The method of correcting for object motion of claim 6 wherein, the input signals have a fixed amplitude, a polarity determined by the polarity of the gamma signals and a period equal to the period between unblanking pulses.

8. The method of correcting for object motion of claim 6 wherein, the input signals have a polarity determined by the polarity of the gamma signal, an amplitude proportional to the amplitude of the gamma signal and a period equal to the period between unblanking pulses.

* * * * *